United States Patent
Li (10) Patent No.: US 10,274,581 B2
(45) Date of Patent: Apr. 30, 2019

(54) METHOD AND APPARATUS FOR POSITION DETERMINATION

(75) Inventor: Sen Li, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/403,553

(22) PCT Filed: Jun. 14, 2012

(86) PCT No.: PCT/CN2012/076901
§ 371 (c)(1),
(2), (4) Date: May 1, 2015

(87) PCT Pub. No.: WO2013/185322
PCT Pub. Date: Dec. 19, 2013

(65) Prior Publication Data
US 2016/0195603 A1    Jul. 7, 2016

(51) Int. Cl.
*H04W 64/00* (2009.01)
*G01S 5/12* (2006.01)
*G01S 5/14* (2006.01)

(52) U.S. Cl.
CPC .................. *G01S 5/14* (2013.01); *G01S 5/12* (2013.01); *H04W 64/00* (2013.01)

(58) Field of Classification Search
CPC .................................. G01S 5/12; H04W 64/00
See application file for complete search history.

(56) References Cited

U.S. PATENT DOCUMENTS

| | | | |
|---|---|---|---|
| 5,907,809 A | 5/1999 | Molnar et al. | |
| 5,976,089 A | 11/1999 | Clark | |
| 7,113,782 B2 * | 9/2006 | Lucidarme | H04W 16/18 370/331 |
| 7,657,288 B2 * | 2/2010 | Chitrapu | H01Q 1/246 455/562.1 |
| 8,428,639 B2 * | 4/2013 | Ezaki | H04W 52/243 455/522 |

(Continued)

FOREIGN PATENT DOCUMENTS

| | | |
|---|---|---|
| CA | 2 639 015 A1 | 2/2010 |
| CN | 1282496 A | 1/2001 |

(Continued)

OTHER PUBLICATIONS

International Search Report for International Application No. PCT/CN2012/076901, dated Mar. 21, 2013, 2 pages.

(Continued)

*Primary Examiner* — Asghar H Bilgrami
(74) *Attorney, Agent, or Firm* — Sage Patent Group (57) ABSTRACT

The application relates to a method for positioning a user equipment (UE) in a cell served by a base station (BS), the BS comprises an array antennas capable of forming two or more beams in the cell, the method comprising: receiving beam information indicating which beam is selected, from the two or more beams, for serving the UE; and positioning the UE by determining an area where the UE is located in the cell based on the beam information. A network device, such as a radio network controller, and a base station for implementing the method are also disclosed. The method can be used with an RTT positioning method to improve the accuracy of position.

11 Claims, 9 Drawing Sheets

(56) References Cited

U.S. PATENT DOCUMENTS

| | | | |
|---|---|---|---|
| 2002/0045451 A1* | 4/2002 | Hwang | H04W 36/0072 455/442 |
| 2003/0017853 A1 | 1/2003 | Kanamaluru et al. | |
| 2003/0114196 A1 | 6/2003 | Chitrapu | |
| 2003/0133429 A1* | 7/2003 | Choi | H04B 7/2684 370/342 |
| 2003/0210713 A1* | 11/2003 | Abdel-Ghaffar | H04B 7/2687 370/503 |
| 2004/0259565 A1* | 12/2004 | Lucidarme | H04W 16/18 455/453 |
| 2005/0130672 A1 | 6/2005 | Dean et al. | |
| 2005/0239475 A1* | 10/2005 | Voltolina | H04W 64/00 455/456.1 |
| 2006/0232467 A1 | 10/2006 | Small | |
| 2009/0058593 A1 | 3/2009 | Breed | |
| 2009/0201152 A1 | 8/2009 | Karr et al. | |
| 2010/0048199 A1* | 2/2010 | Forslow | H04W 24/08 455/423 |
| 2010/0109952 A1 | 5/2010 | Wigren et al. | |
| 2012/0076039 A1* | 3/2012 | Kwon | H04B 7/026 370/252 |
| 2013/0252629 A1* | 9/2013 | Wigren | G01S 5/0236 455/456.1 |
| 2015/0230263 A1* | 8/2015 | Roy | H04W 16/28 455/452.2 |

FOREIGN PATENT DOCUMENTS

| | | |
|---|---|---|
| CN | 1536850 A | 10/2004 |
| CN | 1596511 A | 3/2005 |
| CN | 1719934 A | 1/2006 |
| CN | 1753546 A | 3/2006 |
| CN | 1753550 A | 3/2006 |
| CN | 1787679 A | 6/2006 |
| CN | 1844948 A | 10/2006 |
| CN | 1856161 A | 11/2006 |
| CN | 1913703 A | 2/2007 |
| CN | 102017437 A | 4/2011 |
| EP | 0879423 A1 | 11/1998 |

OTHER PUBLICATIONS

"3rd Generation Partnership Project; Technical Specification Group Radio Access Network; UTRAN lub interface Node B Application Part (NBAP) signalling (Release 8)", 3GPP TS 25.433 V8.12.0, (Jun. 2011), 1180 pages.

"3rd Generation Partnership Project; Technical Specification Group Radio Access Network; UTRAN lur interface Radio Network Subsystem Application Part (RNSAP) signalling (Release 8)", 3GPP TS 25.423 V8.13.0, (Mar. 2012), 1014 pages.

"3rd Generation Partnership Project; Technical Specification Group Services and System Aspects; Universal Geographical Area Description (GAD) (Release 8)", 3GPP TS 23.032 V8.0.0, (Dec. 2008), 29 pages.

International Preliminary Report on Patentability for International Application No. PCT/CN2012/076901, dated Dec. 16, 2014, 6 pages.

European Search Report and Written Opinion for International Application No. PCT/CN2012/076901, dated Mar. 27, 2015, 8 pages.

3GPP TS 25.433, "UTRAN lub interface Node B Application Part (NBAP) signalling," Dec. 2011, V11.0.0.

3GPP TS 25.423, "UTRAN lur interface Radio Network Subsystem Application Part (RNSAP) signalling," Mar. 2012, V11.1.0.

3GPP TS 23.032, "Universal Geographical Area Description (GAD)," Mar. 2011, V10.0.0.

Torbjorn Wigren, "A Polygon to Ellipse Transformation Enabling Fingerprinting and Emergency Location in GSM," May 2011, vol. 60, No. 4, IEEE Transactions on Vehicular Technology.

First China Office for Application No. 201280073872.X, dated Mar. 17, 2016, 17 pages.

Second Office Action for Chinese Application No. 201280073872.X, dated Nov. 18, 2016, 14 pages.

Communication pursuant to Article 94(3) EPC for European Application No. 12879070.6, dated Sep. 12, 2017, 6 pages.

Written Opinion for Application No. PCT/CN2012/076901, dated Mar. 21, 2013, 4 pages.

Third Office Action and search report from foreign counterpart Chinese Patent Application No. 201280073872.X, dated Jun. 6, 2017, 11 pages (translation available only for office action).

Fourth Office Action from foreign counterpart Chinese Patent Application No. 201280073872.X, dated Dec. 26, 2017, 10 pages.

Fifth Office Action from foreign counterpart Chinese Patent Application No. 201280073872.X, dated Jul. 13, 2018, 14 pages.

* cited by examiner

METHOD AND APPARATUS FOR POSITION DETERMINATION

CROSS-REFERENCE TO RELATED APPLICATIONS

This application is a National stage of International Application No. PCT/CN2012/076901, filed Jun. 14, 2012, which is hereby incorporated by reference.

TECHNICAL FIELD

The present application relates to wireless communications. In particular, the application relates to methods and apparatuses for determining a position of a user equipment (UE).

BACKGROUND

Unless otherwise indicated herein, the approaches described in this section are not prior art to the claims in this application and are not admitted to be prior art by inclusion in this section.

Determination of position location may be important for many different types of equipments, particularly for user equipment in a cellular radio system. In a typical cellular radio system, the user equipment communicates via a radio access network (RAN) to one or more core networks. The radio access network covers a geographical area which is divided into cell area, with each cell area being served by a base station, e.g., a radio base station (RBS). Each cell may be further divided into sectors. In some networks a base station may also be called as a "NodeB" (UMTS) or "eNodeB" (LTE). A cell is a geographical area where radio coverage is provided by the RBS. Each cell is identified by an identity within the local radio area, the identity being broadcast in the cell. The base station communicates over the air interface with the UE within range of the base station. In some radio access networks, several base stations are typically connected to a controller node (such as a radio network controller (RNC)) which supervises and coordinates various activities of the plurality of base stations connected thereto. The radio network controllers are typically connected to one or more core networks.

There have already proposed several algorithms for user equipment positioning in a cellular radio system including, among others, Cell Identity (cell ID), round trip time (RTT) positioning, and UE based assisted GPS (A-GPS). The cell ID method simply determines which cell the user equipment is located by identifying the cell to which a received cell ID is associated. Accordingly, the accuracy of the cell ID method is limited by the size of the cell, something that prevents it from being used in more sophisticated applications. RTT positioning method operates by measuring the distance between the antenna of a cell and the UE. This distance restricts the UE location to a circular strip around the base station's antenna. A Polygon To Ellipse Transformation Algorithm can be used together with the cell polygon of the cell to calculate the position of the UE.

The A-GPS positioning method is the most accurate method of the three methods mentioned herein. The A-GPS positioning method needs the UE to be located be equipped with a GPS receiver. As compared to a common GPS positioning method, the A-GPS positioning method makes use of assistance data that allows the UE to improve its performance. The assistance data is composed of GPS time, Ephemeris, Ionospheric corrections, a list over bad satellites, GPS time (accurate to +/−2 seconds) and a UE reference position that is determined with the cell ID positioning method.

The following table shows the normal response time and accuracy for the three methods.

TABLE 1 response time and accuracy of three methods
For Cell-ID method, RNC can get a response within 1.5 s, but the accuracy is poor and depends on the coverage size of cell. The accuracy is in a range of about 500 meters or more. In some cases, such accuracy is useless.

| Method | Typical Response Time (RNC centric) | Accuracy |
| --- | --- | --- |
| Cell Id | <1.5 s<br>Measurement Time: 1 s<br>(if more than 1 radio links, get Best Cell) | poor, depending on the size of the cell |
| RTT | <3 s<br>Measurement Time:<br>RNC->UE: 1 s (Best cell)<br>RNC->UE: 1 s (RxTx)<br>RNC->RBS: 1.5 s (RTT) | more accurate than CELL ID<br>70-100 meters (67%)<br>150-200 meters (97%) |
| A-GPS | <24 s<br>Measurement Time: 20 s | most accurate<br>50 meters (67%)<br>150 meters (97%) |

For RTT positioning method, RNC can get a response within 3 s, and the accuracy is much better than Cell-ID method. However, the accuracy is not good enough to be used in some more sophisticated cases.

For A-GPS position method, RNC can get a response within 24 s, and the accuracy is the best among the three methods. The response for this method, however, is slowest among the three methods. And this approach also needs UE support GPS.

SUMMARY

An object of the present invention is to provide a method and apparatus for positioning a user equipment in a communication network, which can be used with any other positioning methods, for example RTT positioning method, to improve the accuracy of the position.

According to a first aspect, there is provided a method for positioning a user equipment (UE) in a cell served by a base station (BS), the BS comprises an array antennas capable of forming two or more beams in the cell, the method comprising: receiving beam information indicating which beam is selected, from the two or more beams, for serving the UE; and positioning the UE by determining an area where the UE is located in the cell based on the beam information.

Preferably, the beam information may be received from the BS in a Node B Application Part (NBAP) message.

Preferably, the beam information may be received from a Drift Radio Network Controller (DRNC) in a Radio Network Subsystem Application Part (RNSAP) message. In such case, the DRNC receives the beam information from the BS in an NBAP message.

Preferably, the beam that is selected has the best beam gain for the UE among the two or more beams.

Preferably, positioning the UE further comprises: performing a round trip time (RTT) measurement to obtain an RTT between the BS and the UE, and positioning the UE in the cell based on the obtained RTT and the determined area. In such case, a Polygon to Ellipse Transformation Algorithm may be used to position the UE.

Preferably, the method is used in a Wideband Code Division Multiple Access (WCDMA) system.

According to a second aspect, there is provided a network device for positioning a user equipment (UE) in a cell served by a base station (BS), the BS comprising an array antennas capable of forming two or more beams in the cell, the network device comprising: a beam information receiving unit configured to receive beam information indicating which beam is selected, from the two or more beams, for serving the UE; and a positioning unit configured to position the UE by determining an area where the UE is located in the cell based on the beam information.

Preferably, the beam information receiving unit is configured to receive the beam information from the BS in an NBAP message.

Preferably, the beam information receiving unit is configured to receive the beam information from a Drift Radio Network Controller (DRNC) in an RNSAP message.

Preferably, the positioning unit further comprises: a round trip time (RTT) obtaining unit configured to perform an RTT measurement to obtain an RTT between the BS and the UE, and a position determination unit configured to position the UE based on the RTT obtained by the RTT obtaining unit and the area determined.

Preferably, the network device may be a Radio Network Controller.

According to a third aspect, there is provided a base station (BS) for serving a to user equipment (UE) in a cell with an array antenna capable of forming two or more beams in the cell, the BS comprising: a beam selection unit configured to select a beam from the two or more beams for serving the UE; and a beam information transmission unit configured to transmit beam information about the selected beam in response to a request for positioning the UE.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3(a) shows the general structure of a WCDMA, and FIG. 3(b) shows the details of the UTRAN of the WCDMA;

DETAILED DESCRIPTION OF THE INVENTION

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

Multiple Beam Antenna Array

Multiple beam antenna arrays have been used in various cellular communications systems, e.g., the GSM system. A multiple beam antenna array replaces a conventional sector antenna by two or more closely-spaced antenna elements. The antenna array directs a narrow-beam of radiated energy to a specific user equipment to minimize the interference to other user equipments.

Figure 1:
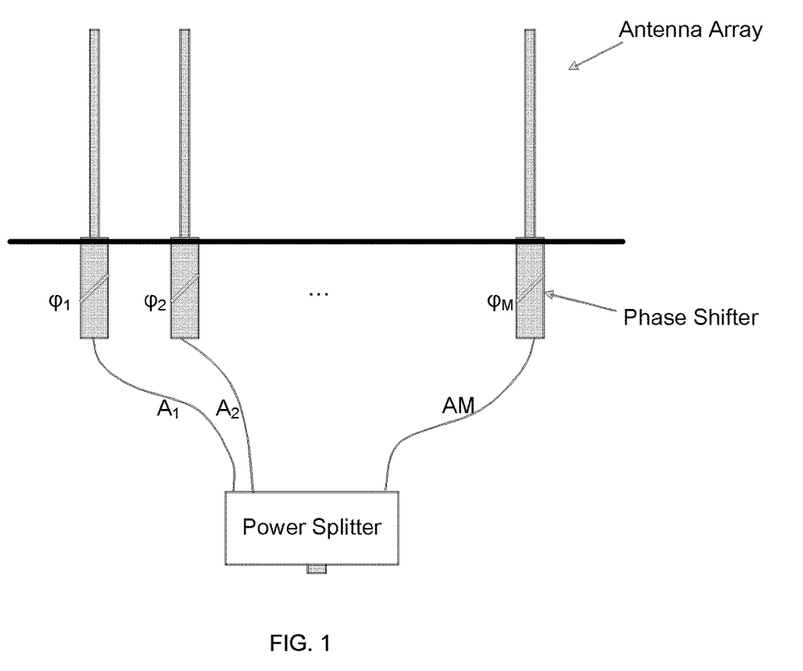
FIG. 1 shows an antenna array that may be arranged in a base station.
Figure 2:
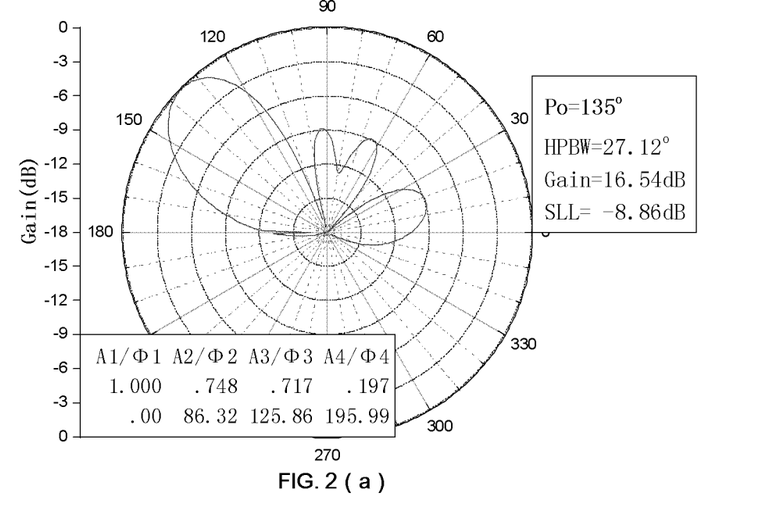
FIG. 2 shows examples of beams generated by applying different parameters to respective antenna elements of an antenna array.

FIG. 1 shows an antenna array that may be arranged in a base station.

As shown, a number M of antenna elements are included in the antenna array. The antenna elements are equally spaced by a distance d.

The beam formed by the antenna array may be expressed as $$f(\varphi) = \sum_{\varphi=0}^{360} \sum_{i=0}^{M-1} A_i e^{j(2\pi i d \sin\varphi + \varphi_i)} \quad \text{(equation 1)}$$

where $A_i$ is the vibration amplitude of antenna element i of the antenna array, M is the number of antenna elements included in the antenna array, d is the distance between antenna elements, and $\varphi_i$ is the initial phase value of antenna element i.

A beam with a different bandwidth can be formed by applying different parameters $\{A_i, \varphi_i\}$ to respective antenna elements of an antenna array with a fixed M number of antenna elements and a known value of d.

FIGS. 2(a)-2(d) show examples of beams generated by applying different parameters to respective antenna elements of an antenna array.

In the figure, $P_0$ denotes the direction having a largest signal gain, and the Half Power Beam-Width (HPBW) can be used to denote the coverage of the beam so formed. In the example, M is taken as four, and d is taken as 0.5 wavelength.

Four beams of HPBW of 30° may be formed to cover a sector with 120° in the coverage of a base station. Certainly, more than four beams may be formed to better cover the sector. The base station that is provided with the antenna array stores the parameters in its memory in advance, and associates the parameters with the location information of the beam formed by the parameters.

Multiple Beam Based Positioning

Figure 3:
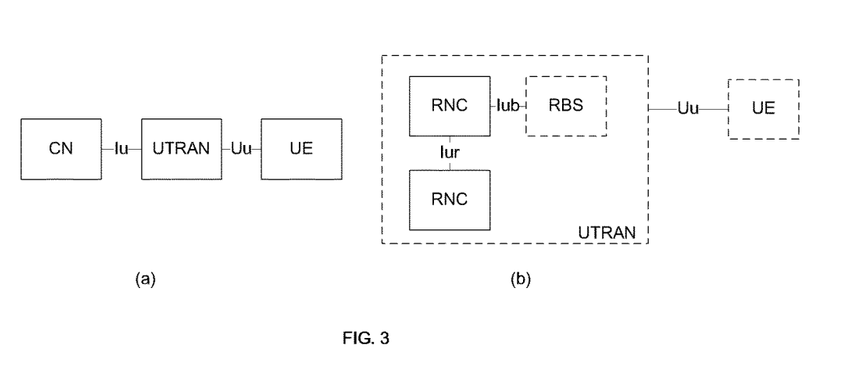
FIG. 3 depicts the general arrangement of a WCDMA system, where

FIG. 3 depicts the general arrangement of a WCDMA system, where FIG. 3(a) shows the general structure of a WCDMA, and FIG. 3(b) shows the details of the UTRAN of the WCDMA.

The example WCDMA system comprises a radio access network (RAN) (e.g., UMTS Terrestrial RAN), a core network (CN), end users and interfaces. Those skilled in the art will appreciate that the technology described herein is also applicable to any other systems than WCDMA.

In a WCDMA system, the user equipments are controlled by, and communicate with the UTRAN over the Radio Resource Control (RRC) protocol. User data like speech and the control signalling is performed on separate interfaces, belong to the so called user plane and control plane, respectively. The UTRAN comprises radio base stations (RBSs) and radio network controllers (RNCs). The RBS and the RNC communicates over the so called NBAP protocol, which is described in Reference [1] (3GPP TS 25.433, "UTRAN Iub interface Node B Application Part (NBAP) signalling," V11.0.0, December, 2011). The core network (CN) is connected to the UTRAN over the RANAP protocol, which is described in Reference [2] (3GPP TS 25.423, "UTRAN Iur interface Radio Network Subsystem Application Part (RNSAP) signalling," V11.1.0, March, 2012). The messages from the CN to UTRAN carry positioning request together with the requested quality of service. In the other direction (from UTRAN to CN) the messages carry computed positions using one of several defined formats.

Figure 4:
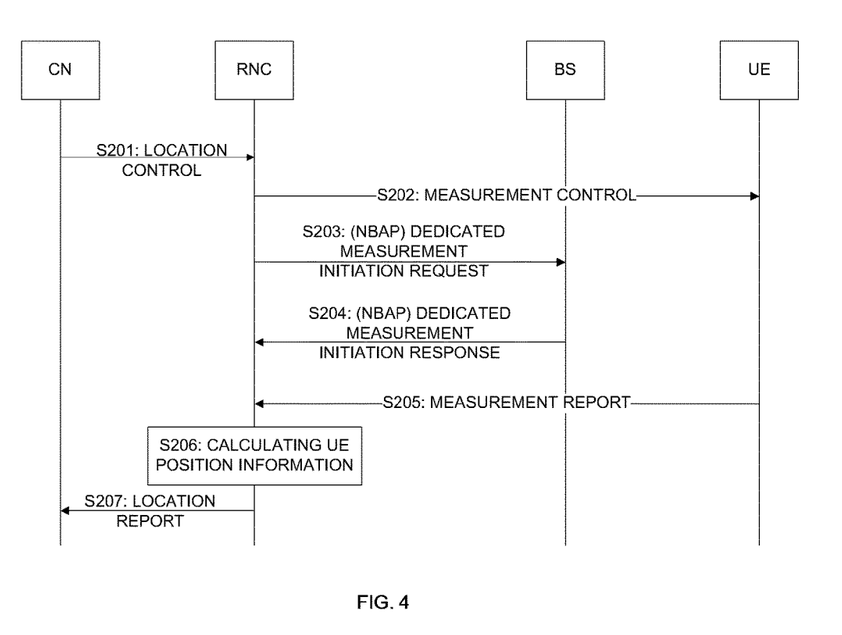
FIG. 4 is a flowchart illustrating RTT positioning method of the prior art.

FIG. 4 is a flowchart illustrating RTT positioning method of the prior art.

As shown, at step 201, the Core Network sends a request message, Location Control, to a Radio Network Controller, requesting the RNC report the position of a user equipment.

At step 202, the Radio Network Controller sends a measurement request, MEASUREMEN CONTROL, to the user equipment to be located.

The user equipment measures a DL/UL timing difference, RxTx, at the user equipment in response to the measurement request.

At step 203, the Radio Network Controller sends an NBPA request message, DEDICATED MEASUREMENT INITIATION REQUEST, to a base station which serves the user equipment to be located. The base station measures the UL/DL frame timing difference, RTT, at the base station in response to the NBPA request message.

At step 204 and 205, the Radio Network Controller receives a measurement response from the base station and from the user equipment, respectively. Particularly, at step 204, the base station sends an NBAP response message, DEDICATED MEASUREMENT INITIATION RESPONSE, back to the Radio Network Controller. At step 205, the user equipment sends a measurement response, MEASUREMENT REPORT, to the Radio Network Controller. The NBAP response message from the base station contains the RTT of the base station. The measurement response from the user equipment contains the RxTx at the user equipment.

At step 206, the Radio Network Controller positions the user equipment based on the RTT and RxTx contained in the received messages.

The distance from the base station to the user equipment is calculated as:

$$D=V*(RTT-RxTx)/2 \quad \text{(equation 2)}$$

where V is the speed of light. The travel time of radio waves from the base station to the user equipment and back is equal to RTT−RxTx.

Finally, at step 207, the RNC reports the determined position of the user equipment to the CN in a Location Report message.

Figure 5:
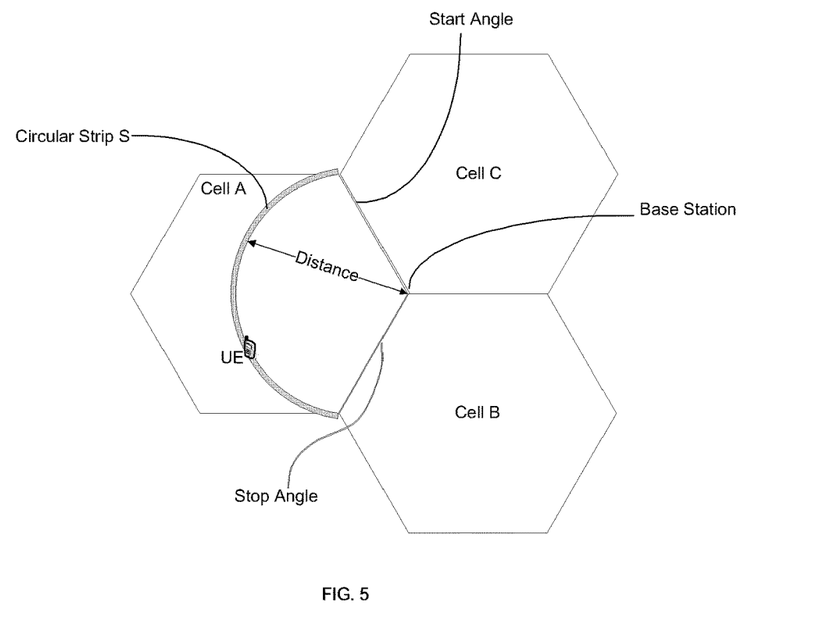
FIG. 5 shows the position result of RTT positioning method as shown in FIG. 4.

FIG. 5 shows the position result of RTT positioning method as shown in FIG. 4. As illustrated, RTT positioning method alone defines a circle, or if the inaccuracy is accounted for, a circular strip around the base station. By combing this information with the cell polygon, a start angle and a stop angle of the circular strip S can be computed. The position of the user equipment is determined as the intersection of the serving cell and the circular strip S.

In positioning applications, the positioning method used by the RNC in a WCDMA UTRAN determines the region where the user equipment is located, said region expressed as one of the geometrical shapes known from Reference [3] (3GPP TS23.032, "Universal Geographical Area Description (GAD)," V11.1.0, March, 2012). The selected geometrical shape is most often tied to the positioning method. For instance, the cell identity method normally reports the position of the user equipment with a polygon representing the cell extension whereas RTT positioning method normally exploits the ellipsoid arc shape. The need of shape conversion functionality arises because the end user, to whom the determined position is reported, may prefer other position formats than generated by the applied position method. Accordingly, in order to determine the ellipsoid arc a user equipment is located in RTT positioning method, a Polygon to Ellipse Transformation Algorithm is used with the polygon of the cell, the RTT between the base station and the user equipment as input, to determine the ellipsoid arc the user equipment is located. The Polygon to Ellipse Transformation Algorithm is described in, for example, Reference [4] (IEEE TRANSACTIONS ON VEHICULAR TECHNOLOGY, "A Polygon to Ellipse Transformation Enabling Fingerprinting and Emergency Location in GSM," Torbjörn Wigren, Vol. 60, No. 4, May 2011), which is incorporated herein by reference. The Polygon to Ellipse Transformation Algorithm is an algorithm used to calculate the user equipment's position based on the RTT and the start/stop angle. This algorithm has been used in GSM/WCDMA position calculation.

Figure 6:
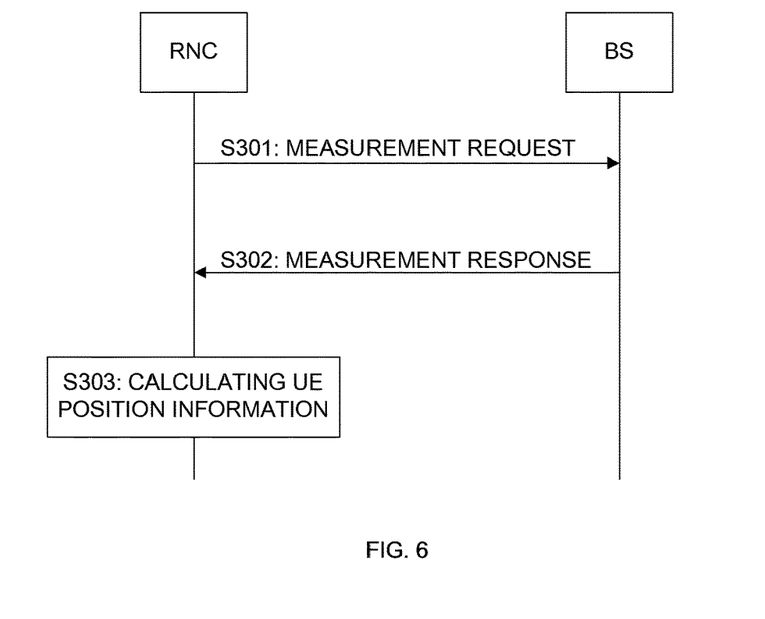
FIG. 6 is a flowchart illustrating a method of positioning a user equipment according to an embodiment of the invention.

FIG. 6 is a flowchart illustrating a method of positioning a user equipment according to an embodiment of the invention.

The method is applicable in the same system as shown in FIG. 3. The only difference is that the base station is provided with an antenna array capable of forming several narrow beams. For example, the base station can use several beams to cover a sector it serves, i.e., serve a user equipment in its coverage by one of the beams.

The principle of the present application is to position a user equipment in an area of the sector by means of the beam information of a beam that serves the user equipment. Such area is significantly smaller than the whole sector opening up for a better accuracy of the determined position if it is used in any other positioning methods, for example RTT positioning method.

At step 301, the RNC sends a measurement request to the base station that serves the user equipment to be located.

The base station determines one beam among the several beams that serves the UE, in response to the measurement request.

At step 302, the base station sends a measurement response including the beam information of the determined beam back to the RNC.

The RNC then determines the area the base station is located in the cell based on the received beam information at step 303.

Figure 7:
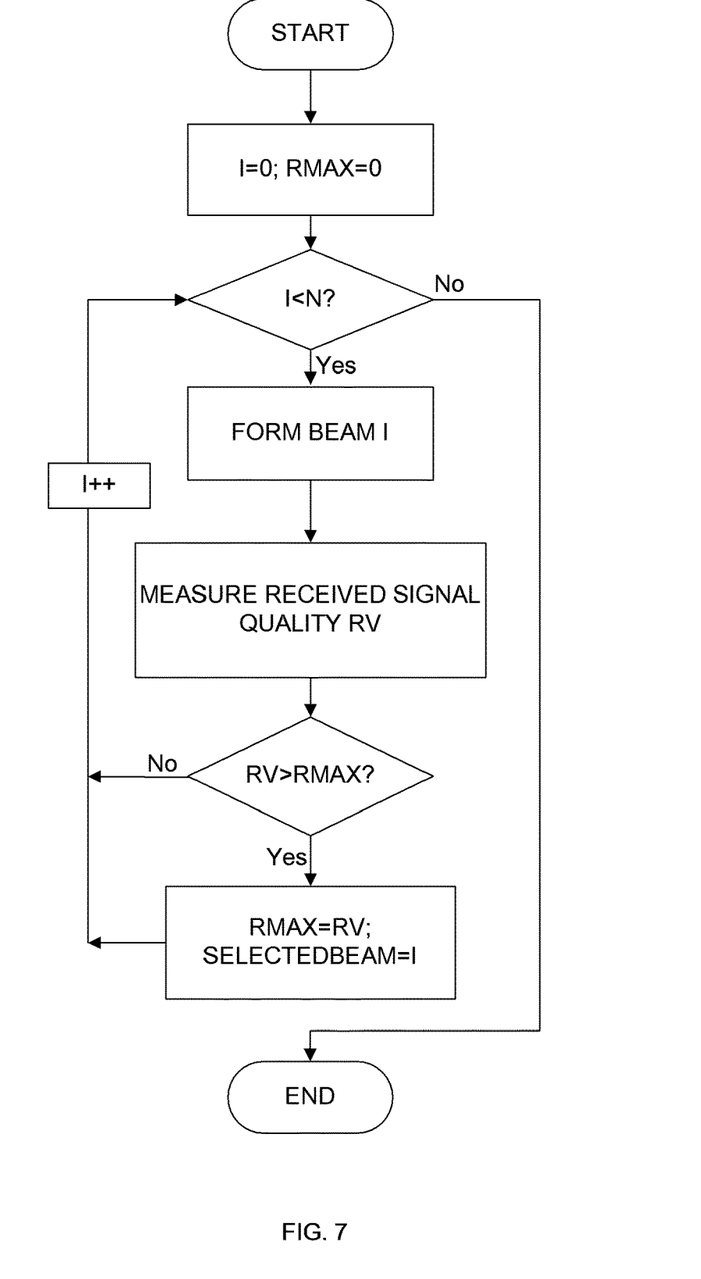
FIG. 7 is a flowchart illustrating a method of selecting a beam to serve a user equipment at a base station.

FIG. 7 is a flowchart illustrating a method of selecting a beam to serve a user equipment at a base station.

At the beginning, a variable I denoting the number of the outstanding beam and a selection criterion variable RMAX are set to zero.

The base station applies parameters of beam 0 to respective antenna elements of the antenna array, so as to form beam 0. The base station obtains a received signal from the user equipment to be located over the beam. The selection criterion RMAX is compared with the received signal strength indicator (RSSI) of the received signal. If RMAX is lower than the RSSI of the received signal, it is set to the RSSI of the received signal. Otherwise, it remains unchanged.

The process goes on with beam 1, beam 2 . . . beam N. It is assumed herein that the base station may form a number N of beams by means of the antenna array to serve the user equipment.

When all beams have been tested, the beam having the largest RSSI is selected as the beam to be used for serving the user equipment. If the user equipment is located in the coverage of beam I, the signal strength of the received signal for beam I is larger than that of any other beams. Accordingly, by finding the largest signal strength of a received signal from the user equipment, the beam and thus the coverage of the beam to be used (i.e., the area where the UE is located) can be determined.

In the present invention, the selection criterion is not limited to the RSSI. The selection criterion is used to find the beam having the best beam gain in the direction from the base station to the user equipment (or vice versa) among the beams that may be formed by means of the antenna array. The found beam can be used to position the user equipment in the sector. Accordingly, a signal to noise ratio (SNR), for example, can also be used as the selection criterion to determine the right beam.

The method according to the present application can be used in connection with other positioning method, for example RTT positioning method, to improve the accuracy of position.

Figure 8:
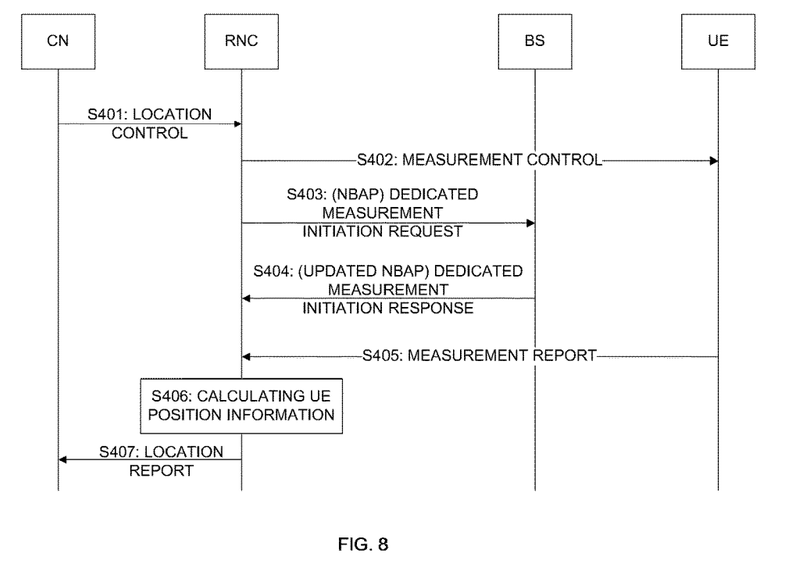
FIG. 8 is a flowchart illustrating an RTT positioning method according to an embodiment of the invention.

FIG. 8 is a flowchart illustrating an RTT positioning method according to an embodiment of the invention.

As shown, at step 401, the Core Network sends a request message, Location Control, to a Radio Network Controller, requesting the RNC report the position of a user equipment.

At step 402, the Radio Network Controller sends a measurement request, MEASUREMEN CONTROL, to the user equipment to be located.

The user equipment measures a DL/UL timing difference, RxTx, at the user equipment in response to the measurement request.

At step 403, the Radio Network Controller sends an NBPA request message, DEDICATED MEASUREMENT INITIATION REQUEST, to a base station which serves the user equipment to be located. The base station measures the UL/DL frame timing difference, RTT, at the base station in response to the NBPA request message. At the same time, the base station selects a beam for serving the user equipment from a plurality of beams that are used to serve the sector.

At step 404 and 405, the Radio Network Controller receives a measurement response from the base station and from the user equipment, respectively. Particularly, at step 404, the base station sends an NBAP response message, DEDICATED MEASUREMENT INITIATION RESPONSE, back to the Radio Network Controller. At step 405, the user equipment sends a measurement response, MEASUREMENT REPORT, to the Radio Network Controller. The NBAP response message from the base station contains the RTT of the base station and beam information of the selected beam. The measurement response from the user equipment contains the RxTx at the user equipment.

At step 406, the Radio Network Controller positions the user equipment based on the RTT, beam information and RxTx contained in the received messages.

Finally, at step 407, the RNC reports the determined position of the user equipment to the CN in a Location Report message.

Figure 9:
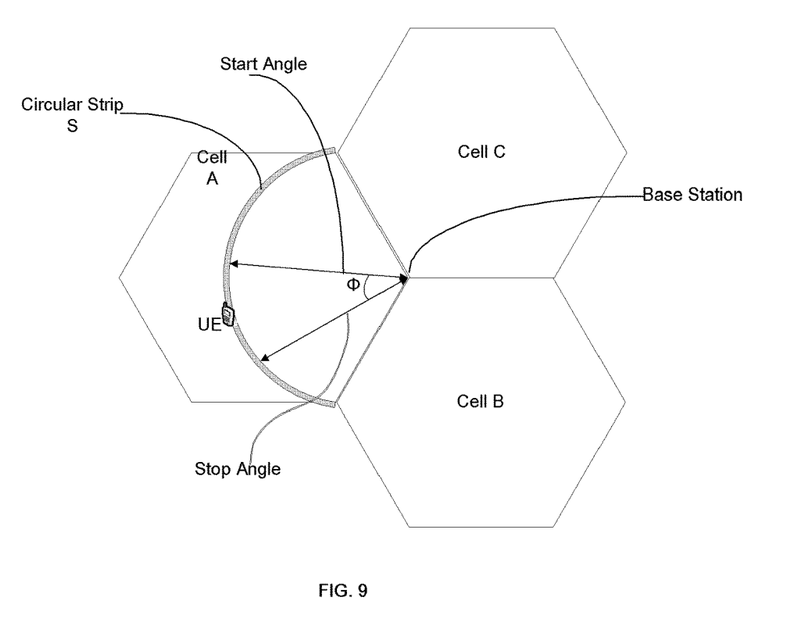
FIG. 9 shows the position result of the RTT positioning method as shown in FIG. 8.

FIG. 9 shows the position result of the RTT positioning method as shown in FIG. 8. As illustrated, the RTT positioning method alone defines a circle, or if the inaccuracy is accounted for, a circular strip around the base station. By combing this information with the cell polygon, a start angle and a stop angle of the circular strip S can be computed. By using the beam information, the circular strip S can be narrowed down to 120 degrees/N instead of 120 degrees in the prior art in case N (N>2) beams are used to cover the whole sector. Accordingly, the accuracy of position is enhanced greatly.

In the embodiment, the NBAP message, DEDICATED MEASUREMENT INITIATION RESPONSE is updated to contain the beam information. A proposal updating is shown in the following table:

TABLE 2 a proposal updating of NBAP message, DEDICATED MEASUREMENT INITIATION RESPONSE

| IE/Group Name | Present | Valurs/Ranges/Parameter origin/ |
|---|---|---|
| Message Discriminator | Present (M) | Same with legacy |
| Message type | Present (M) | Same with legacy |
| . . . | | |
| Multi beam based position inforamation | Not present | It is defined as char type. Xxxx yyyy Bit7→bit 0 xxxx used to indicate the total number of beams that are used to cover the sector. yyyy used to indicate which beam is used to serve the UE. If it is not contained, it means multi beam based position is not used |

A byte not present in the prior art is included in the updated NBAP message if the positioning method according to the present application is used. If the byte is not included therein, the RNC may be aware of that a normal RTT positioning method is used. Otherwise, the RNC may get the beam information from the byte. In the example, the beam information is represented by the total number of the beams and the specific identifier of the beam that is selected. As an example, if four beams with the same HPBW are used to cover the sector and it is determined that the UE is served by beam 0, the RNC may determine that the user equipment is located in an area from 0 degree to 30 degrees of the sector.

The beam information is not limited to the total number of beams and the specific identifier as shown in the table above. For example, the base station can include directly the start angle and stop angle of the selected beam in the updated NBAP message.

Figure 10:
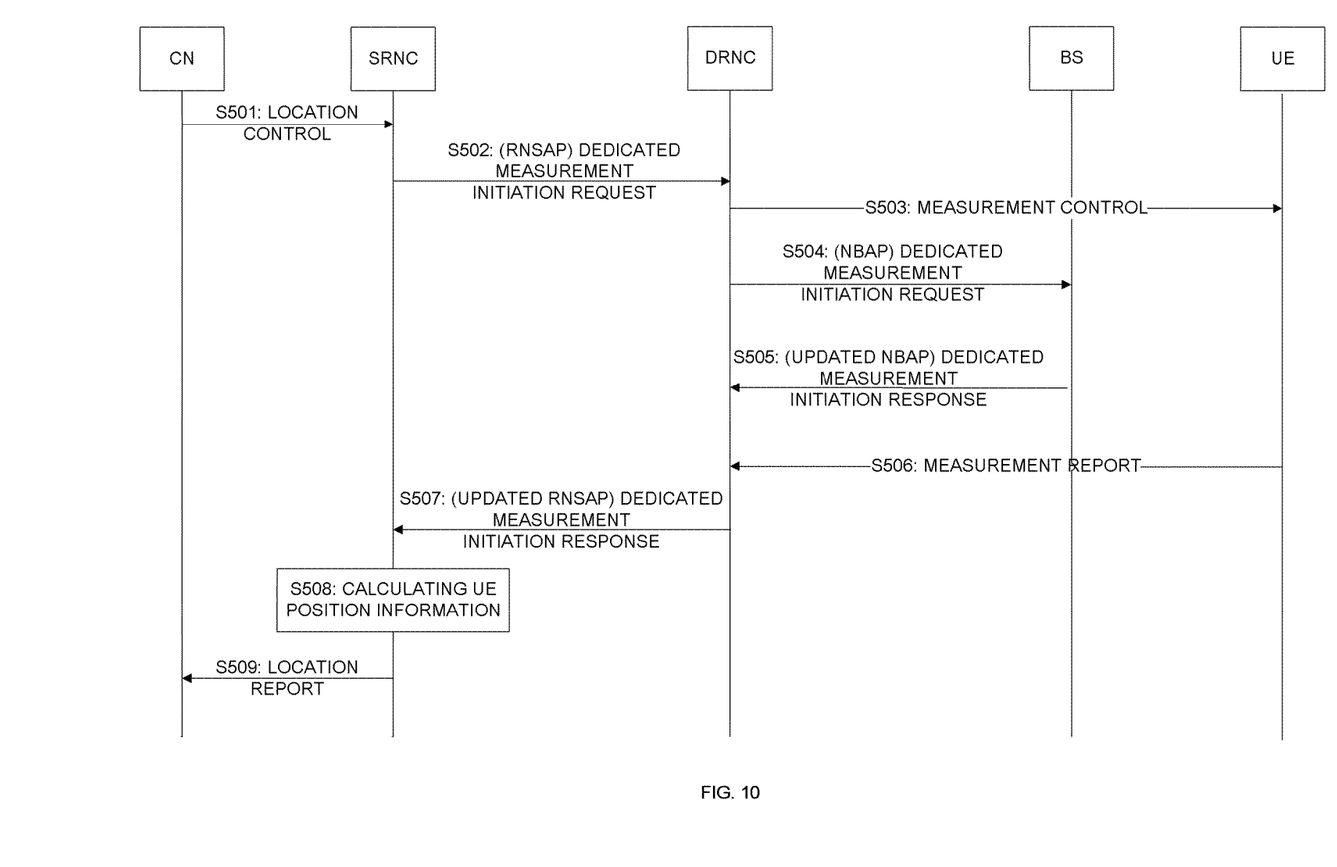
FIG. 10 is a flowchart illustrating an RTT positioning method according to another embodiment of the invention.

FIG. 10 is a flowchart illustrating an RTT positioning method according to another embodiment of the invention.

In the embodiment, the user equipment to be located is connected to a Drift Radio Network Controller (DRNC). The DRNC is connected to a Core Network (CN) via a Serving Radio Network Controller (SRNC).

As shown, at step 501, the Core Network sends a request message, Location Control, to a SRNC, requesting the SRNC report the position of a user equipment.

At step 502, the SRNC sends an RNSAP request message, DEDICATED MEASUREMENT INITIATION REQUEST to a DRNC to which the UE to be located is connected.

At step 503, the DRNC sends a measurement request, MEASUREMEN CONTROL, to the user equipment to be located.

The user equipment measures a DL/UL timing difference, RxTx, at the user equipment in response to the measurement request.

At step 504, the DRNC sends an NBPA request message, DEDICATED MEASUREMENT INITIATION REQUEST, to a base station which serves the user equipment to be located. The base station measures the UL/DL frame timing difference, RTT, at the base station in response to the NBPA request message. At the same time, the base station selects a beam for serving the user equipment from a plurality of beams that are used to serve the sector.

At step 505 and 506, the DRNC receives a measurement response from the base station and from user equipment, respectively. Particularly, at step 505, the base station sends an NBAP response message, DEDICATED MEASUREMENT INITIATION RESPONSE, back to the DRNC. At step 506, the user equipment sends a measurement response, MEASUREMENT REPORT, to the DNRC. The NBAP response message from the base station contains the RTT of the base station and beam information of the selected beam. The measurement response from the user equipment contains the RxTx at the user equipment.

At step 507, the DRNC sends an RNSAP response message, DEDICATED MEASUREMENT INITIATION RESPONSE, back to the SRNC. The RNSAP response from the DRNC contains the RTT of the base station, beam information of the selected beam and the RxTx at the user equipment.

At step 508, the SRNC positions the user equipment based on the RTT, beam information and RxTx contained in the received message.

Finally, at step 509, the SRNC reports the determined position of the user equipment to the CN in a Location Report message.

In the embodiment, the NBAP response message from the base station to the DRNC is updated to contain the beam information. The updating can be performed in the similar way illustrated in Table 2.

In the embodiment, the RNSAP message, DEDICATED MEASUREMENT INITIATION RESPONSE, is also updated to contain the beam information. As an example, a proposal updating is shown in the following table:

TABLE 3 a proposal updating of RNSAP message, DEDICATED MEASUREMENT INITIATION RESPONSE

| IE/Group Name | Present | Valurs/Ranges/Parameter origin/ |
|---|---|---|
| Message Discriminator | Present (M) | Same with legacy |
| Message type | Present (M) | Same with legacy |
| ... | | |
| Multi beam based position inforamation | Not present | It is defined as char type. Xxxx yyyy Bit7→bit 0 xxxx used to indicate the total number of multi beam which is used to cover the sector. yyyy used to indicate which beam is used to serve the UE. If it is not contained, it means multi beam based position is not used |

A byte not present in the prior art is included in the updated RNSAP message if the positioning method according to the present application is used. If the byte is not included therein, the SRNC may be aware of that a normal RTT positioning method is used. Otherwise, the SRNC may get the beam information from the byte. In the example, the beam information is represented by the total number of the beams and the specific identifier of the beam that is selected. As an example, if four beams with the same HPBW are used to cover the sector and it is determined that the UE is served by beam 0, the SRNC may determine that the UE is located in an area from 0 degree to 30 degrees of the sector.

Figure 11:
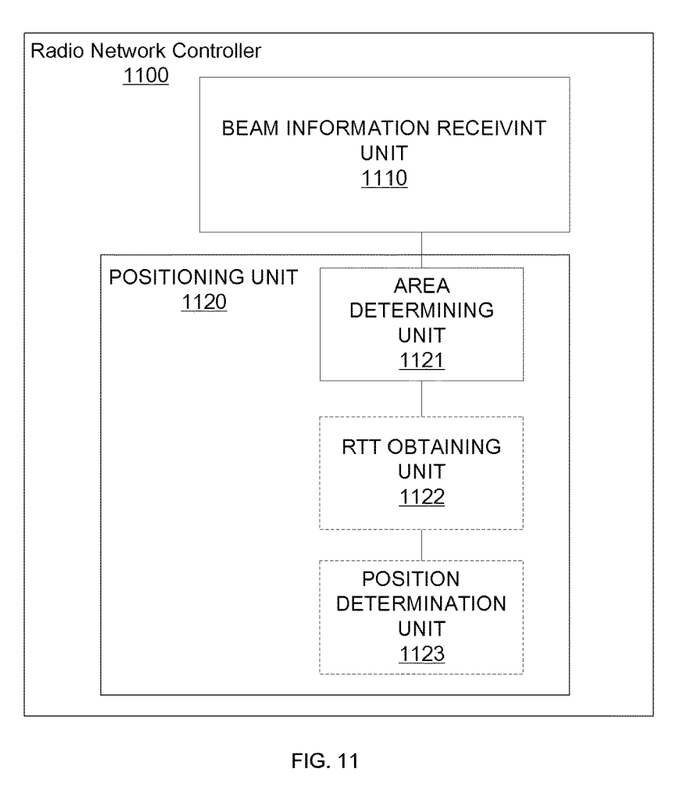
FIG. 11 is a block diagram illustrating an example Radio Network Controller according to an embodiment of the invention.

FIG. 11 is a block diagram illustrating a Radio Network Controller 1100 according to an embodiment of the invention.

As shown, the radio network controller 1100 comprises a beam information receiving unit 1110 for receiving beam information; and a positioning unit 1120 for positioning the user equipment.

The positioning unit 1120 further comprises an area determining unit 1121 for determining an area whether the user equipment is located in the cell based on the beam information; an RTT obtaining unit 1122 for initiating an RTT measurement to obtain the RTT between the base station and the user equipment; and a position determination unit 1123 for positioning the user equipment based on the area determined by the area determining unit 1121 and the RTT obtained by the RTT obtaining unit 1122.

When applied in the embodiment as shown in FIG. 8, the beam information receiving unit 1110 may receive the beam information from the base station in an NBAP message at step 404.

When applied in the embodiment as shown in FIG. 10, the radio network controller 1100 is configured as an SRNC, and the beam information receiving unit 1110 may receive the beam information from a DRNC in an RNSAP message at step 507. In the example, the DRNC is further provided with a new unit (not shown) for receiving the beam information in an NBAP message from the RBS and a new unit (not shown) for transmitting the beam information in an RNSAP message to the SRNC.

Figure 12:
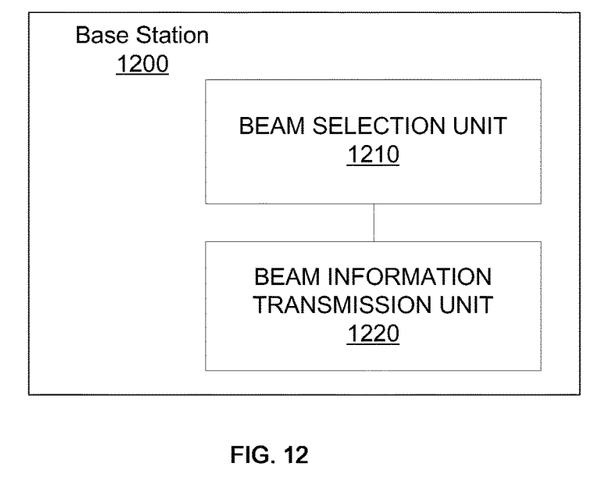
FIG. 12 is a block diagram illustrating an example base station according to an embodiment of the invention.

FIG. 12 is a block diagram illustrating an example base station 1200 according to an embodiment of the invention.

As shown, the base station 1200 comprises a beam selection unit 1210 for selecting a beam from a plurality of beams for serving the user equipment; and a beam information transmission unit 1220 for transmitting beam information about the selected beam in response to a request for positioning the user equipment.

When applied in the embodiment as shown in FIG. 8, the beam information transmission unit 1220 may transmit the beam information in an NBAP message at step 404, in response to the request message sent at step 403 from the RNC.

When applied in the embodiment as shown in FIG. 10, the beam information transmission unit 1220 may transmit the beam information to the DRNC in an NBAP message at step 505, in response to the request message sent at step 504 from the DRNC.

The above embodiments are described with the RNCs (SRNC or DRNC) performing the position algorithm to obtain the final position result and reporting it to the CN; however, the present invention is not limited thereto. For example, the functions may be implemented at the base station, or even other network devices if applicable.

It should be emphasized that the term "comprises/comprising" when used in this specification is taken to specify the presence of stated features, integers, steps, or components, but does not preclude the presence or addition of one or more other features, integers, steps, components, or groups thereof.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

In the following, abbreviations used in the present application are listed:
UE User Equipment
RAN Radio Access Network
RBS Radio Base Station
BS Base Station
ID Identity
RNC Radio Network Controller
RTT Round Trip Time
A-GPS Assisted GPS
BS Base Station
SRNC Serving Radio Network Controller
DRNC Drift Radio Network Controller
NBAP Node B Application Part
RNSAP Radio Network Subsystem Application Part
WCDMA Wideband Code Division Multiple Access
RSSI Received Signal Strength Indicator
UL Uplink
DL Downlink
3GPP 3$^{rd}$ Generation Partnership Project
eNB E-UTRAN Node B
LTE Long Term Evolution
UL Uplink
UTRAN Universal Terrestrial Radio Access Network

REFERENCE

[1] 3GPP TS 25.433, "UTRAN Iub interface Node B Application Part (NBAP) signalling," V11.0.0, December, 2011;
[2] 3GPP TS 25.423, "UTRAN Iur interface Radio Network Subsystem Application Part (RNSAP) signalling," V11.1.0, March, 2012;
[3] 3GPP TS23.032, "Universal Geographical Area Description (GAD)," V11.1.0, March, 2012; and
[4] IEEE TRANSACTIONS ON VEHICULAR TECHNOLOGY, "A Polygon to Ellipse Transformation Enabling Fingerprinting and Emergency Location in GSM," Torbjörn Wigren, Vol. 60, No. 4, May 2011.

What is claimed is:

1. A method for positioning a user equipment (UE) in a cell served by a base station (BS), the BS comprising an antenna array capable of forming two or more beams in the cell, the method comprising:
performing a round trip time (RTT) measurement to obtain an RTT between the BS and the UE;
receiving beam information and the RTT in a Node B Application Part (NBAP) message, the beam information indicating a selection of a beam, from the two or more beams, to serve the UE; and
positioning the UE by determining an area where the UE is located in the cell based at least in part on both the beam information and the RTT included in the NBAP message, wherein positioning the UE in the cell based on the obtained RTT and the determined area comprises using a Polygon to Ellipse Transformation Algorithm.

2. The method of claim 1, wherein the beam information is received by a Drift Radio Network Controller (DRNC), and wherein the DRNC sends the beam information to a Serving Radio Network Controller (SRNC) in a Radio Network Subsystem Application Part (RNSAP) message.

3. The method of claim 2, wherein the DRNC receives the beam information from the BS in the NBAP message.

4. The method of claim 1, wherein the beam that is selected has the best beam gain for the UE among the two or more beams.

5. The method of claim 1, wherein the method is used in a Wideband Code Division Multiple Access (WCDMA) system.

6. A network device for positioning a user equipment (UE) in a cell served by a base station (BS), the BS comprising an antenna array capable of forming two or more beams in the cell, the network device comprising:
a positioning unit to perform a round trip time (RTT) measurement to obtain an RTT between the BS and the UE;
a beam information receiving unit to receive beam information and the RTT in a Node B Application Part (NBAP) message, the beam information indicating a selection of a beam, from the two or more beams, to serve the UE; and
a positioning unit to position the UE by determining an area where the UE is located in the cell based at least in part on both the beam information and the RTT included in the NBAP message, wherein the positioning unit is operative to use a Polygon to Ellipse Transformation Algorithm.

7. The network device of claim 6, wherein the beam information is received by a Drift Radio Network Controller (DRNC), and wherein the DRNC sends the beam information to a Serving Radio Network Controller (SRNC) in a Radio Network Subsystem Application Part (RNSAP) message.

8. The network device of claim 6, wherein the beam that is selected has the best beam gain for the UE among the two or more beams.

9. The network device of claim 6, wherein the network device is a Radio Network Controller.

10. A base station (BS) for serving a user equipment (UE) in a cell with an array antenna operative to form two or more beams in the cell, the BS comprising:
- a positioning unit to perform a round trip time (RTT) measurement to obtain an RTT between the BS and the UE;
- a beam selection unit to select a beam from the two or more beams to serve the UE; and
- a beam information transmission unit to transmit the RTT and beam information about the selected beam in response to a request to position the UE, wherein the RTT and beam information is transmitted in a Node B Application Part (NBAP) message, and wherein the transmitted RTT and beam information is used by a network device to position the UE in the cell based at least in part on both the RTT and beam information included in the NBAP message, wherein the beam information is transmitted in a Radio Network Subsystem Application Part (RNSAP) message when the request to position the UE comes from a Drift Radio Network Controller (DRNC).

11. The BS of claim 10, wherein the beam selection unit selects a beam that has the best beam gain for the UE among the two or more beams.

* * * * *